April 5, 1932.　　　　　E. W. MITCHEL　　　　　1,852,978
NUT AND METHOD OF FABRICATION AND ASSEMBLY
Filed Aug. 16, 1928　　　2 Sheets-Sheet 1
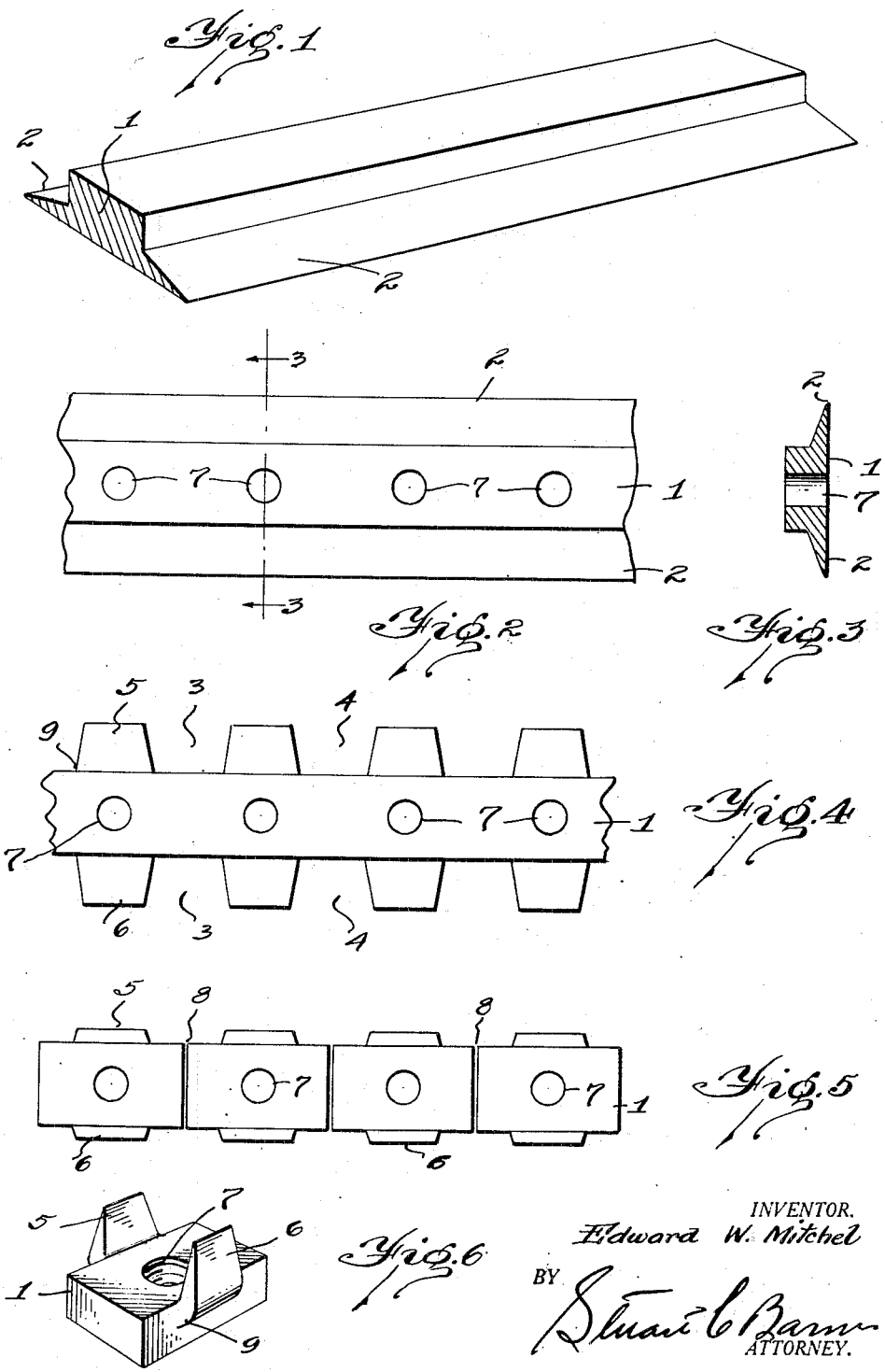
INVENTOR.
Edward W. Mitchel
BY
ATTORNEY.

April 5, 1932.  E. W. MITCHEL  1,852,978
NUT AND METHOD OF FABRICATION AND ASSEMBLY
Filed Aug. 16, 1928  2 Sheets-Sheet 2

INVENTOR.
Edward W. Mitchel
BY
ATTORNEY.

Patented Apr. 5, 1932

1,852,978

UNITED STATES PATENT OFFICE

EDWARD W. MITCHEL, OF DETROIT, MICHIGAN, ASSIGNOR TO F. L. McLAUGHLIN COMPANY, A PARTNERSHIP OF FRED G. RICHARDSON AND FRANK L. McLAUGHLIN, OF DETROIT, MICHIGAN

NUT AND METHOD OF FABRICATION AND ASSEMBLY

Application filed August 16, 1928. Serial No. 299,951.

This invention relates to a nut and method of fabrication and assembly, and has to do particularly with a novel form of nut and the manner of assembling the same in fixed relation with a suitable part or parts preparatory to receiving a bolt.

In the manufacture of a large number of articles, and particularly sheet metal articles requiring fastening means such as nuts and bolts, the design of the article has frequently made it very difficult to place the nut in position for proper assembly. Various types of nuts have been designed for assembly with such type of sheet metal articles whereby the nut is adapted to be inserted in a suitable aperture in the sheet metal and so assembled therewith as to be fixed with relation to the sheet metal preparatory to receiving the fastening or securing bolt. However, these bolts of the prior art have been relatively expensive to manufacture in that they have usually required one or more expensive machining operations.

It is the object of the present invention to provide a novel nut which is fabricated by a relatively inexpensive punch press operation and requiring no machining whatsoever except the tapping of the hole. This novel nut is provided with ears or lugs which are positioned and extend from the side thereof, and the nut is designed to be initially positioned in a suitable aperture in the sheet metal and designed to be prevented from turning solely by said ears.

Not only is the nut fabricated in a novel manner to produce an entirely new article, but such nut is assembled with relation to the sheet metal part in a novel manner. The ears of the nut are preferably of less length than the nut itself and are sheared from thin stock so as to present the greatest accuracy. In shearing the nut itself the ears are also turned up substantially vertically, and in assembling the nut with relation to the sheet metal part such ears are inserted in an opening in the sheet metal, the sides of the ears preferably fitting fairly snugly with the sides of the opening of the sheet metal with the ends fitting the aperture loosely.

The final assembly of this nut involves another important feature, namely, due to the particular arrangement and shape of the ears, such ears will expand laterally to first fill up the aperture and position the nut axially, and then in flattening out or driving home the ears they are so fabricated as to result in a double bend and produce a flat surface, the double bend and lower radius effecting an easy distortion of the sheet metal.

Other important features will be brought out in the specification and claims.

In the drawings:

Fig. 1 is a perspective view of the peculiarly shaped bar stock of which my novel nut is fabricated.

Fig. 2 is a plan view of such bar stock with the holes punched therein.

Fig. 3 is a sectional view taken on line 3—3 of Fig. 2.

Fig. 4 illustrates the next step of the fabrication process wherein the side flanges in the stock are cut away whereby to leave laterally projecting ears in alignment with the punched out hole.

Fig. 5 illustrates the next step of the process wherein a completed nut is sheared off.

Fig. 6 is a perspective view of my novel completely fabricated nut.

Figure 7:
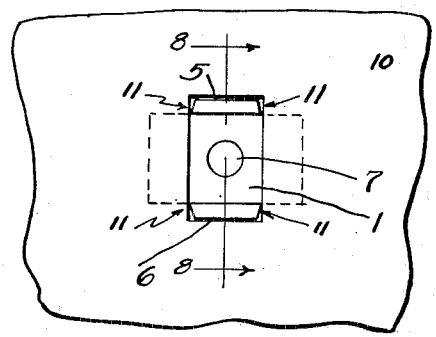
Fig. 7 is a plan view illustrating the first step in the method of assembling the nut with relation to a sheet metal part.

One of the important features of the present invention is the forming of the nut from the specially shaped bar stock, and in Fig. 1 I have shown a bar of stock best suited for the fabrication of this novel nut. This bar of stock preferably comprises a relatively thick section 1, which forms the body, and two oppositely disposed tapering and relatively thin flanges 2.

In fabricating the nut I preferably use three operations which function separately but are simultaneous in action, whereby every stroke of the press will mean a complete fabricated nut.

In Fig. 2 I have illustrated the punching operation, and in Fig. 3 I have shown a cross section of the bar stock after being punched. In Fig. 4 I have shown the next step wherein the flanges 2 at each side of the main body of the stock are partly cut away. I preferably cut away the portions 3 at one operation, and the bar stock is moved along to cut out the second portions 4, whereby to form the ears 5 and 6 symmetrically with the punched holes 7.

The next operation in the fabrication of the nut is best illustrated in Fig. 5 wherein the nut is sheared off as at 8, and simultaneously with the shearing operation the ears 5 and 6 are bent upwardly, as best shown in Fig. 6. In other words, as the punch or upper die presses the stock downwardly in engagement with the shearing member on the lower die, the two dies are so arranged as to bend upwardly the ears 5 and 6 in the same operation.

It will be obvious that flanges 2, being relatively thin, may be punched with a similar punching operation, and that due to this thinness the punched out members 5 and 6 will be very accurate, which would be quite the contrary if the stock to be sheared or punched were thick. Another very important feature in this method of fabrication is that the ears extending laterally from the stock, as shown in Fig. 3, are pressed at right angles during the shearing operation so that the main body of the nut has nothing to do with the locating of the nut in the sheet metal part adapted to receive the same.

In the preferred fabrication of this nut the ears 5 and 6 are sheared so that they present a slight taper. The shearing of the ears 5 and 6 is predetermined with reference to the width of the hole in which the nut is to be inserted. The base 9 is preferably of the correct width so that when the nut is inserted in the aperture in the sheet metal plate it results in a snug fit. In Fig. 7 a nut is shown as inserted in the aperture of the sheet metal plate 10, and the result is that at the points 11 there will be a snug fit between the nut and the side walls of the aperture, and there will preferably be a slight space between the ends of the aperture and the ears.

Figure 8:
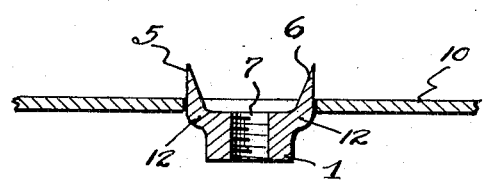
Fig. 8 is a sectional view taken on the line 8—8 of Fig. 7.
Figure 9:
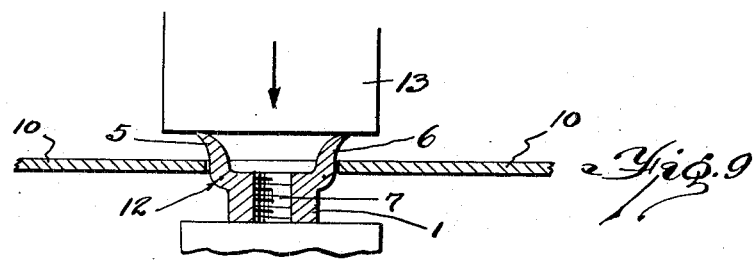
Fig. 9 is a view similar to Fig. 8 illustrating the intermediate step of expanding the ears of the nut so as to centrally position the nut with relation to the aperture.
Figure 10:
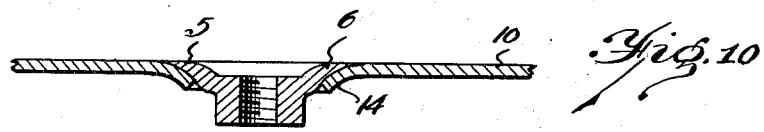
Fig. 10 is a sectional view similar to Fig. 8 and illustrating the manner of bending in the sheet metal portion adjacent the ears of the nut.
Figure 11:
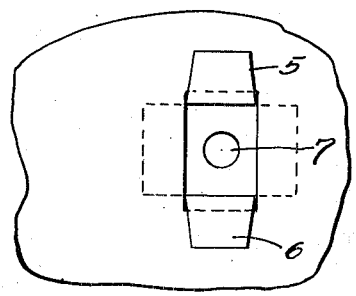
Fig. 11 is a plan view of the assembled nut.

In Fig. 8 I have shown the manner of initially inserting the nut in the aperture of the sheet metal plate, the two ears preferably extending upwardly or at right angles to the plane of the sheet metal plate and the radii 12 of the ears obviously being positioned at points below the plane of the sheet metal plate 10.

After the nut has been inserted, with the metal plate touching the contacting or upper surface of the nut as represented in Fig. 8, the plate is subjected to any suitable pressure, such as by means of the plunger 13; and the ears 5 and 6 are expanded whereby to centrally locate the nut with reference to the end walls of the aperture. The bending radius of each ear being located below the plane of the sheet metal receiving plate, it will be obvious that the resulting expanding action will accurately and centrally locate the nut.

Continued travel of the plunger 13 or other compressing means will of course further expand the ears 5 and 6, and due to the peculiar location of the radius of each ear a double bending action will result. In other words, the ears will be expanded outwardly and the portion of the sheet metal plate 10 directly under the ears will be quickly and easily distorted, as at 14, whereby to present a perfectly flat surface.

The fact that the ears 5 and 6 extend laterally from the nut and are bent at right angles, and the fact that the radii of such ears are located above the plane of the sheet metal, materially assists in the expanding of the ears and the distortion of the sheet metal during the final clamping of the nut to the sheet metal plate. This double bending action not only materially assists the clamping of the nut and flattening out of the same by distorting the sheet metal, but it also permits such bending and distortion with a minimum amount of effort.

It will be obvious that I have provided a novel nut which may be fabricated entirely by a punch press operation. That is, there is absolutely no machining required, the hole being punched, the thin ears being sheared, and the entire nut then being sheared off in a single punch press operation, thus making a very inexpensive product.

It will be understood that the punching, cutting out, and shearing of the nut are preferably successive operations performed on a bar of stock which is intermittently fed forwardly; and that while these operations are successive they are preferably simultaneous, so that with each simultaneous punching, cutting out and shearing operation a complete nut is fabricated. It will be obvious that the entire locating of the nut within the aperture of the plate which receives the same is done by means of the thin ears which are preferably turned up simultaneously with the shearing operation, which removes the completed nut from the bar of stock.

It will be further obvious that this novel manner of shearing the ears of the nut from very thin flanges of bar stock makes it possible to obtain a high degree of accuracy with a punch press operation; that not only are these thin ears accurate so as to locate the nut with respect to the hole receiving the same in one direction, but such ears are bent upwardly, whereby their bending radii will permit the same to be expanded, thus centrally locating the nut with respect to the aperture receiving the same in the other direction. It will be obvious that this method of assembly completely eliminates the necessity of cutting, milling, or otherwise machining shoulders on the nut so as to correctly locate the same within the aperture within which it is to be clamped.

What I claim is:

1. As a new article of manufacture, a nut adapted to be initially positioned with respect to the part to be secured, comprising a nut for receiving the bolt, and ears positioned on and having their base portion extending laterally from opposite sides of the threaded hole in the nut, said ears being of less length than the sides of the nut to which they are connected and having their upper ends extending at substantially right angles to the plane of the nut.

2. As a new article of manufacture, a nut of the type adapted to be initially clamped into position before receiving a bolt, comprising a blank provided with a tapped hole, a pair of ears diametrically spaced on each side of said tapped hole, the base portion of said ears extending outwardly from separate sides of the blank and the upper portions being bent substantially at right angles thereto.

3. As a new article of manufacture, a nut of the type adapted to be initially clamped into position before receiving the bolt, comprising a blank provided with a tapped hole, a pair of ears diametrically spaced on each side of the said tapped hole, the base portions of said ears extending outwardly from opposite sides of the blank and the end portions being bent at substantially right angles, said ears being adapted to be inserted into an aperture having a width approximately the same as the width of the ears, and a length approximately the same as the over-all length from one ear to the other.

4. As a new article of manufacture, a nut adapted to be permanently clamped in an aperture in a sheet metal plate, comprising a rectangular base, a pair of ears extending laterally from opposite sides of said base, and being bent upwardly, said ears being of less length than the sides of the blank to which they are attached and being relatively thin.

5. The combination of a sheet metal plate and a permanently positioned nut, comprising a nut blank having a flat contacting surface and a plate with a suitable aperture therein, a pair of ears on opposite sides of and connected to said nut blank at points below said contacting surface and extending upwardly and outwardly through the aperture in said plate, the portions of the plate adjacent said ear being deformed whereby said upwardly and outwardly extending ears are substantially within the plane of the surface of said plate.

6. The combination of a sheet metal plate and a permanently positioned nut, comprising a nut blank having a contacting surface and a plate with a suitable aperture therein, a pair of ears extending from opposite sides of said nut blank at points below said surface and extending upwardly and outwardly through the aperture in said plate, the portions of the plate adjacent said ear being deformed whereby said upwardly and outwardly extending ears are substantially within the plane of the surface of said plate, said ears being the sole means for positioning the nut blank with respect to the aperture in said plate.

7. The method of fabricating and assembling nuts of the type adapted to be firmly clamped to a plate, which comprises forming an aperture in the plate and fabricating the nut to provide a body portion and a pair of ears extending laterally from opposite sides of the body but bent at substantially right angles thereto, inserting the ears in said aperture to a point of the place of contact of the body of the nut, then expanding said ears laterally to first position the nut with reference to the aperture, and then clamping the same into position.

8. The method of fabricating and assembling nuts of the type adapted to be firmly clamped to a plate, which comprises forming an aperture in the plate and fabricating the nut to provide a body portion and a pair of ears extending laterally from the body but bent upwardly at substantially right angles thereto, inserting the ears in said aperture until the body of the nut comes in contact with said plate, then expanding said ears laterally to first position the nut with reference to the aperture, and then continuing the expansion of said ears whereby to distort an unsupported portion of the plate beneath the ears.

9. The combination of a sheet metal plate and a permanently positioned nut, comprising a nut and a plate with a rectangular aperture therein, a pair of ears on opposite sides of said nut and extending through the aperture in said plate, the upper part of said nut contacting with said plate and the portion of the plate adjacent the ears being unsupported and being deformed by the ears whereby the outer surfaces of the ears are substantially within the plane of the surface of said plate.

In testimony whereof I have affixed my signature.

EDWARD W. MITCHEL.